(12) United States Patent
Yoda

(10) Patent No.: US 8,942,075 B2
(45) Date of Patent: Jan. 27, 2015

(54) BATTERY MANAGEMENT DEVICE, BATTERY APPARATUS, DISK ARRAY APPARATUS AND BATTERY MANAGEMENT METHOD

(71) Applicant: Yutaka Yoda, Tokyo (JP)

(72) Inventor: Yutaka Yoda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/846,115

(22) Filed: Mar. 18, 2013

(65) Prior Publication Data
US 2013/0258830 A1 Oct. 3, 2013

(30) Foreign Application Priority Data
Mar. 27, 2012 (JP) ................................ 2012-071790

(51) Int. Cl.
G11B 27/36 (2006.01)
H02J 7/00 (2006.01)

(52) U.S. Cl.
CPC ............ H02J 7/0068 (2013.01); H02J 7/0047 (2013.01); G11B 27/36 (2013.01)
USPC ......................... 369/53.42; 369/243; 320/136

(58) Field of Classification Search
None
See application file for complete search history.

(56) References Cited

U.S. PATENT DOCUMENTS

| 5,347,163 | A  | * | 9/1994  | Yoshimura       | 307/66  |
|-----------|----|---|---------|-----------------|---------|
| 6,741,065 | B1 | * | 5/2004  | Ishii et al.    | 320/122 |
| 7,633,265 | B2 | * | 12/2009 | Matsushima et al.| 320/133 |
| 7,812,480 | B2 | * | 10/2010 | Datta et al.    | 307/66  |
| 2005/0182981 | A1 | * | 8/2005 | Hayashi         | 369/53.18 |
| 2006/0056142 | A1 | * | 3/2006 | Takahashi et al.| 361/683 |
| 2007/0047100 | A1 | * | 3/2007 | Takahashi et al.| 359/689 |
| 2009/0160401 | A1 | * | 6/2009 | Dishman et al.  | 320/119 |
| 2010/0106631 | A1 | * | 4/2010 | Kurayama et al. | 320/107 |
| 2012/0274281 | A1 | * | 11/2012 | Kim            | 320/112 |
| 2013/0009605 | A1 | * | 1/2013 | Hongo et al.    | 320/134 |
| 2013/0093396 | A1 | * | 4/2013 | Dien            | 320/118 |

FOREIGN PATENT DOCUMENTS

| JP | H8-37740 A     |   | 2/1996 |
| JP | 1997121461 A   |   | 5/1997 |
| JP | 2001023588 A   |   | 1/2001 |
| JP | 2003111289 A   | * | 4/2003 |

(Continued)

OTHER PUBLICATIONS

Japanese Office Action for JP Application No. 2012-071790 mailed on Apr. 8, 2014 with partial English Translation.

(Continued)

*Primary Examiner* — Thang Tran
(74) *Attorney, Agent, or Firm* — Sughrue Mion, PLLC

(57) ABSTRACT

Disclosed is a battery management device 1 and the like that maintains each secondary battery (SB) 2 in an appropriate state. The battery management device 1 calculates a degradation state of no smaller than the three SB 2 to be managed separately, selects, as the new power source, one of the SB 2 that have not been selected as a power source among a plurality of the SB 2 as management objects based on the degradation state, selects one of the plurality of the SB 2 that have been selected as the power source based on the degradation state and removing it from the power source, changes a combination of a plurality of the secondary batteries as the power source based on the degradation state, and activates the SB 2 disconnected from the power source by discharging and charging the SB 2.

11 Claims, 10 Drawing Sheets

(56) References Cited

FOREIGN PATENT DOCUMENTS

| | | |
|---|---|---|
| JP | 2006209218 A | 8/2006 |
| JP | 2006300561 A | 11/2006 |
| JP | 2007-68338 A | 3/2007 |
| JP | 2009-201327 A | 9/2009 |
| JP | 2010-124634 A | 6/2010 |
| JP | 2010-232106 A | 10/2010 |
| JP | 2011-38878 A | 2/2011 |
| JP | 2011-72157 A | 4/2011 |

OTHER PUBLICATIONS

Japanese Office Action for JP Application No. 2012-071790 mailed on Nov 25, 2014 with English Translation.

* cited by examiner

BATTERY MANAGEMENT DEVICE, BATTERY APPARATUS, DISK ARRAY APPARATUS AND BATTERY MANAGEMENT METHOD

This application is based upon and claims the benefit of priority from Japanese Patent Application No. 2012-071790, filed on Mar. 27, 2012 reference.

TECHNICAL FIELD

The present invention relates to a battery management device which manages a secondary battery, and a battery apparatus, a disk array apparatus and a battery management method.

BACKGROUND ART

There is a disk array apparatus as one of storage devices. A disk array apparatus has a structure in which a plurality of hard disks are connected in parallel, thereby, the disk array stores a great deal of data. Such disk array apparatus has a built-in cache memory and can reduce a time to access data by using the cache memory.

Generally, the disk array apparatus operates by a commercial power supply. For this reason, in the disk array apparatus, when the commercial power supply is cut off, data which has been stored in a cache memory disappears. Taking this into consideration, the disk array apparatus has a secondary battery (battery pack) as a standby power source (auxiliary power supply). In addition, the disk array apparatus is equipped with a function to, in case of a blackout, write data of the cache memory into the hard disk using electric power of the standby power source. As a result, the disk array apparatus prevents a situation in which data in the cache memory disappears due to the blackout.

In Patent document 1 (Japanese Patent Application Laid-Open No. 2006-209218), there is shown an example of a battery unit included in a disk array apparatus. In this battery unit, a battery and a battery charging and discharging circuit for the battery are connected in an one-to-one relationship.

In Patent document 2 (Japanese Patent Application Laid-Open No. 1997-121461), there is shown a battery power supply made by combining a secondary battery and a solar cell. The battery power supply indicated in Patent document 2 has at least two groups of secondary batteries. Further, the battery power supply has a function to switch a group of secondary batteries which have been charged by the solar cell and the group of secondary batteries of a discharged state alternately.

In Patent document 3 (Japanese Patent Application Laid-Open No. 2001-23588), there is indicated a battery pack mounted on a mobile phone. The battery pack is equipped with a function to reduce an amount of charge to about 50%, for example, of full charge when it is in a state of being removed from the mobile phone (in other words, when detection of entering a state of preservation is made).

SUMMARY

Meanwhile, a phenomenon in which an amount of electric power that can be inputted and outputted decreases (hereinafter, this phenomenon is referred to as degradation) occurs to a secondary battery due to inactivation of materials in the battery caused by aging or by charging and discharging. An apparatus which estimates a life expectancy of the secondary battery due to such degradation is indicated by patent document 4 (Japanese Patent Application Laid-Open No. 2006-300561). The apparatus disclosed in Patent document 4 estimates the life expectancy of a combined battery in which a plurality of the secondary batteries are combined. In other words, the apparatus of Patent document 4 is managed in the state of the combined battery in which a plurality of secondary batteries are combined. For this reason, the apparatus of patent document 4 cannot obtain the state of each secondary battery constituting a combined battery.

In order to settle the above-mentioned problem, the present invention has been devised. That is, one of a main purpose of the present invention is to provide a battery management device, a battery apparatus, a disk array apparatus and a battery management method which can check degradation states of a plurality of secondary batteries separately, and thereby maintain each secondary battery in an appropriate state.

In order to achieve the above object, a battery management device includes: a charging circuit to charge a secondary battery; a discharging circuit which discharges the secondary battery; a path switching circuit including a function to switchably connect no smaller than the three secondary batteries to be managed objects with one of the charging circuit and the discharging circuit, separately, and a function to connect a plurality of the secondary batteries selected as a power source among the secondary batteries to be managed such that the secondary batteries selected as a power source are in a specific connection state; an information collection unit to collect at least one of information indicating a charging situation about the secondary battery connected to the charging circuit via the path switching circuit, and information indicating a discharging situation about the secondary battery connected to the discharging circuit via the path switching circuit as battery status information; and a controller to calculate a degradation state of each of the secondary batteries of management objects based on the battery status information, and manage each of the secondary batteries of management objects based on the calculated degradation state.

The controller includes: a function to select a plurality of the secondary batteries as the power source by using the degradation state; a reorganization function to make one of the secondary batteries not selected as the power source be a new power source as substitute for one of the secondary battery selected based on the degradation state from the secondary batteries having been selected as the power source; a refreshing function to activate the secondary battery having been disconnected from the power source by the reorganization function by using the discharging circuit and the charging circuit; and a function to control the path switching circuit according to a prescribed control procedure.

A battery apparatus of the present invention includes no smaller than three secondary batteries and the battery management device of the present invention.

A disk array apparatus of the present invention includes a plurality of hard disks being a storage medium capable of at least one of being read and being written by a computer and the battery apparatus of the present invention as an auxiliary power supply.

A battery management method according to the present invention includes, by a computer, collecting at least one of information indicating a charging situation about a secondary battery to be managed and information indicating a discharging situation about the secondary battery being discharged as battery status information; calculating a degradation state of the secondary battery to be managed based on the battery status information; selecting one of the secondary batteries having not been selected as a power source from no smaller than three the secondary batteries of management objects as new the power source based on the degradation state; selecting one of a plurality of the secondary batteries having been selected as the power source based on the degradation state and disconnecting the selected secondary batteries from the power source; changing a combination of a plurality of the secondary batteries as the power source; and activating the secondary battery having been disconnected from the power source by discharging and charging the secondary battery.

According to the present invention, the degradation states of a plurality of the secondary batteries can be checked separately, and by this, the each secondary battery can be maintained in an appropriate state.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments according to the present invention will be described with reference to drawings herein below.

First Exemplary Embodiment

Figure 1:
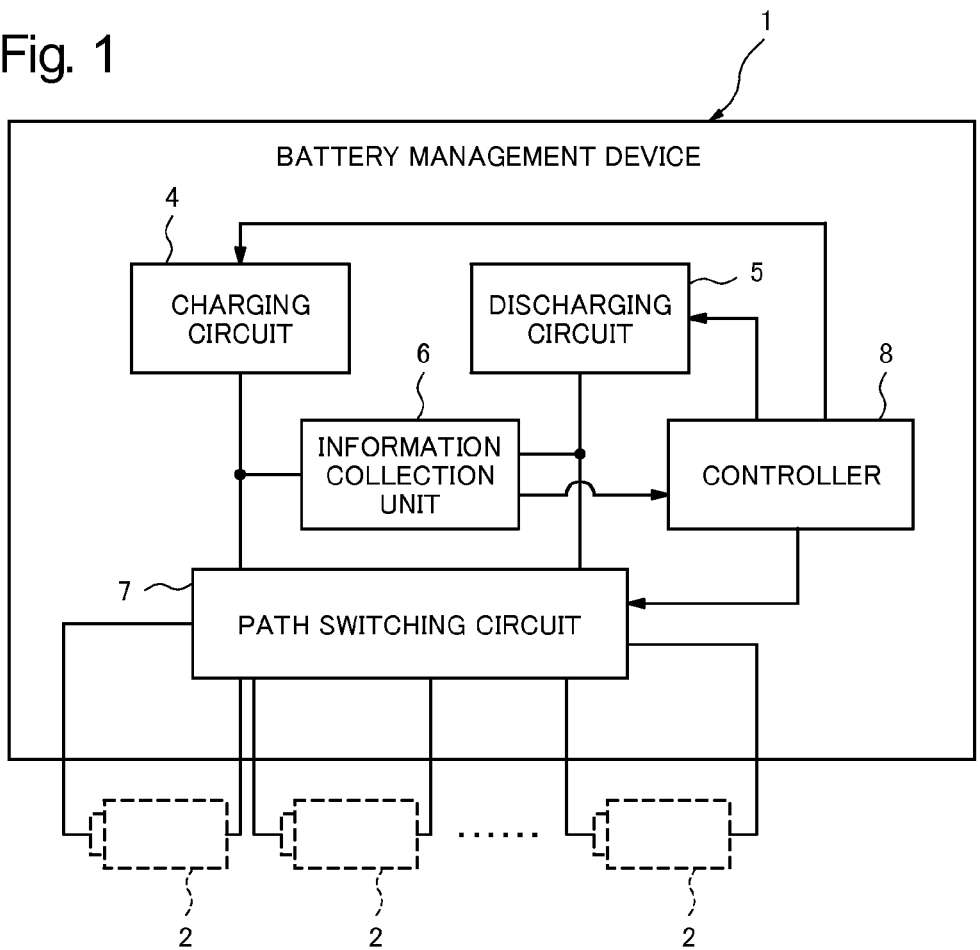
FIG. 1 is a block diagram showing a structure of a battery management device of a first exemplary embodiment according to the present invention in a simplified manner.

FIG. 1 is a block diagram which shows a structure of a battery management device of a first exemplary embodiment according to the present invention in a simplified manner. The battery management device 1 of the first exemplary embodiment is a device which manages no smaller than three secondary battery 2. The battery management device 1 has a charging circuit 4, a discharging circuit 5, information collection unit 6, a path switching circuit 7 and a controller 8.

The charging circuit 4 has a circuit configuration to charge the secondary battery 2. The discharging circuit 5 has a circuit configuration to discharge the secondary battery 2. The path switching circuit 7 is equipped with a function to switchably connect no smaller than three secondary batteries 2 to be managed (as a management object(s)) to the charging circuit 4 or the discharging circuit 5 separately. Further, the path switching circuit 7 has a function to perform connection of a plurality of the secondary batteries 2 selected as a power source among the secondary batteries 2 to be managed in a way that they will be in a specific connection state.

The information collection unit 6 is equipped with a function to collect battery status information. The battery status information is at least one of information which indicates a charging situation about the secondary battery 2 connected to the charging circuit 4 via the path switching circuit 7 and information which indicates the discharging situation about the secondary battery 2 connected to the discharging circuit 5 via the path switching circuit 7.

The controller 8 is equipped with a function to calculate a degradation state of the each secondary battery 2 as the management object based on the battery status information, and manage the each secondary battery 2 of an management object as follows based on the calculated degradation states. That is, the controller 8 has a function to select the plurality of the secondary batteries 2 as the power source by using the degradation state. Further, the controller 8 has a following reorganization function. That is, in the reorganization function, the controller 8 selects a new power source which has not been selected as the power source. In addition, the controller 8 selects one of the plurality of the secondary batteries 2 selected as the power source based on the degradation state, and removes the selected secondary battery 2 from the power source. As a result, the controller 8 changes the combination of a plurality of the secondary batteries 2 as the power source (the secondary battery 2 as the power source are reorganized).

The controller 8 has a refreshing function to activate the secondary battery 2 that has been disconnected from the power source by the reorganization function using the discharging circuit 5 and the charging circuit 4. Further, the controller 8 has a function to control the path switching circuit 7 according to a prescribed control procedure.

The battery management device 1 of the first exemplary embodiment can charge and discharge the secondary battery 2 as the management object separately, and calculate the degradation state of the each secondary battery 2 based on the information related to a charging situation and a discharging situation (the battery status information). As a result, the battery management device 1 can maintain the each secondary battery 2 as the management object in an appropriate state respectively based on a degradation state. When charging or discharging of the plurality of the secondary batteries is performed together as one battery group, for example, the degradation state of the each secondary battery constituting the battery group cannot be obtained. In contrast, as mentioned above, the battery management device 1 of the first exemplary embodiment can obtain the degradation state of the each secondary battery 2. As a result, the battery management device 1 can manage the secondary battery 2 so that the degradation state of the each secondary battery 2 may become comparable (uniform), for example.

In addition, by calculating a degradation state of the secondary battery 2 based on the battery status information collected when discharging or charging the secondary battery 2 that has not selected as the power source, the battery management device 1 can obtain a degradation state of the secondary battery 2 while maintaining a state that electric power can be supplied as a power source.

The battery management device 1 can achieve a longer life of the secondary battery 2 because the each secondary battery 2 can be managed separately as mentioned above.

Further, the battery management device 1 can reorganize a combination of the secondary battery 2 as the power source easily by the path switching circuit 7. As a result, the battery management device 1 can make the number of the secondary battery 2 that drop off the power source less than the number of the secondary battery 2 as the power source.

Figure 2:
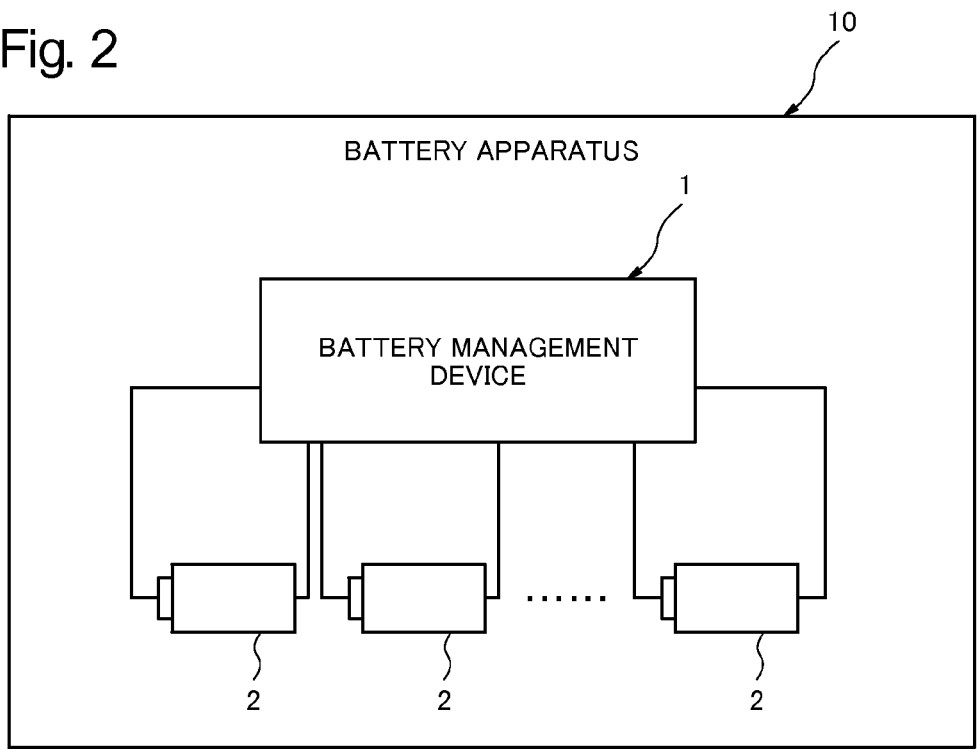
FIG. 2 is a block diagram showing a structure of a battery apparatus equipped with the battery management device of the first exemplary embodiment in a simplified manner.

The battery management device 1 of the first exemplary embodiment can constitute a battery apparatus 10 as shown in FIG. 2. That is, this battery apparatus 10 has three or more secondary battery 2 and the battery management device 1 that manages the secondary battery 2.

The battery apparatus 10 can equalize a degradation state of the each secondary battery 2 by individual-oriented management of the each secondary battery 2 because it is equipped with the battery management device 1. As a result, the battery apparatus 10 can achieve a long life. Also, miniaturization and cost reduction of the battery apparatus 10 can be achieved because the number of the secondary battery 2 that drop off the power source can be made less than the number of the secondary battery 2 as the power source.

Figure 3:
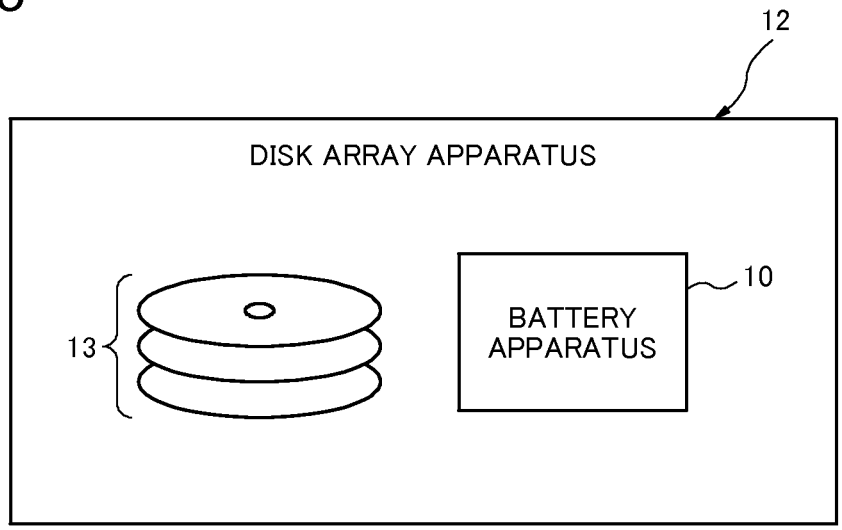
FIG. 3 is a diagram showing an exemplary configuration of a disk array apparatus equipped with the battery apparatus shown in FIG. 2 in a simplified manner.

The battery apparatus 10 can constitute a disk array apparatus 12 as shown in FIG. 3. The disk array apparatus 12 has a plurality of hard disks 13 and the battery apparatus 10. The disk array apparatus 12 can improve reliability of an auxiliary power supply because it is equipped with the battery apparatus 10 as the auxiliary power supply (standby power source).

Second Exemplary Embodiment

A second exemplary embodiment according to the present invention will be described below.

Figure 4:
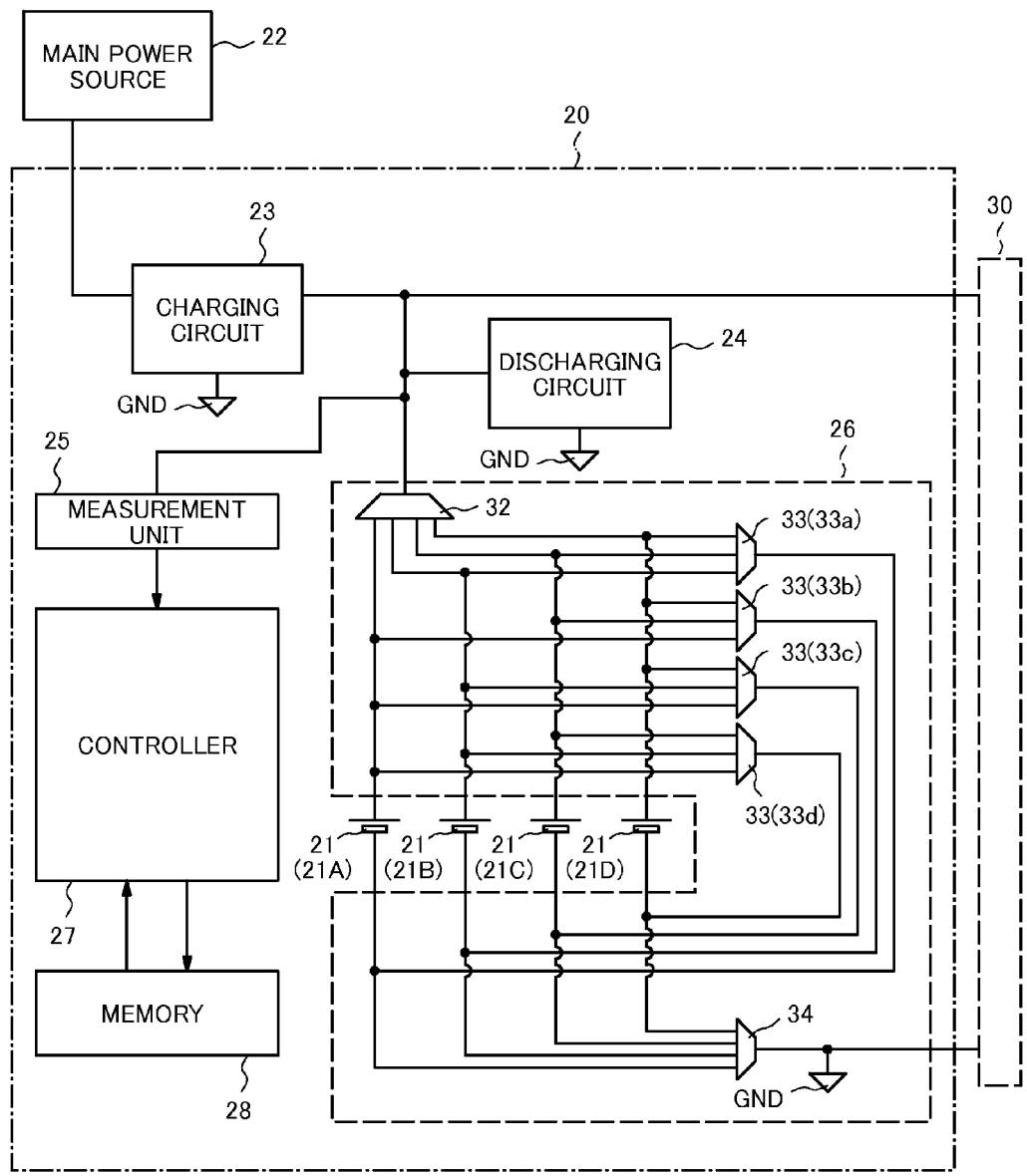
FIG. 4 is diagram showing a structure of a battery apparatus of a second exemplary embodiment according to the present invention in a simplified manner.

FIG. 4 is a diagram showing a structure of a battery apparatus (battery pack) of the second exemplary embodiment according to the present invention in a simplified manner. This battery apparatus (battery pack) 20 is provided in a disk array apparatus having a plurality of hard disks (storage media capable of at least one of being read and written by a computer) as an auxiliary power supply, for example. When supply of electric power from a commercial power supply, for example, which is a main power source 22 to the disk array apparatus stops (is cut off), the battery apparatus 20 supplies electric power to an electric power supply destination (the controller of the disk array apparatus, for example) 30.

The battery apparatus 20 of the second exemplary embodiment has no smaller than three secondary batteries (elementary battery) 21 and a battery management device described next. Meanwhile, for simplification of description, it is supposed that the secondary batteries 21A, 21B, 21C and 21D are provided as the secondary batteries 21 in the second exemplary embodiment.

According to the second exemplary embodiment, the battery management device has a charging circuit 23, a discharging circuit 24, a measurement unit 25 as an information collection unit, a path switching circuit 26, a controller 27 and a memory 28.

The charging circuit 23 has a circuit configuration to charge the secondary battery 21 by using electric power of the commercial power supply, for example, which is the main power source 22. The discharging circuit 24 has a circuit configuration to discharge the secondary battery 21. Meanwhile, according to the second exemplary embodiment, the circuit of the discharging circuit 24 is composed so that a discharge current discharged from the secondary battery 21 may become stable around a current value prescribed in advance.

The path switching circuit 26 has a function to connect the secondary batteries 21 to the charging circuit 23 or the discharging circuit 24 separately, and a function to perform connection of a plurality of the secondary batteries selected as a power source so that they may be in a specific connection state. More specifically, in the second exemplary embodiment, the path switching circuit 26 has a multiplexer 32 as an output switching unit, a multiplexer 33 (33a-33d) as a connection switching unit and a multiplexer 34 as a grounding switching unit, as shown in FIG. 4.

The multiplexers 32, 33 (33a-33d) and 34 include one output stage and a plurality of (four, for example) input stages, respectively. The output stage of the multiplexer 32 is connected to the charging circuit 23, the discharging circuit 24 and the electric power supply destination 30. One of the input stages of the multiplexer 32 is connected to the positive electrode side of the secondary battery 21A. Three other input stages of the multiplexer 32 are connected to the input stages of the multiplexer 33a different from each other, respectively. An input stage of the multiplexer 33b, an input stage of the multiplexer 33c and the positive electrode side of the secondary battery 21D are connected to one of conducting routes connecting the multiplexer 32 and the multiplexer 33a. An input stage of the multiplexer 33b, an input stage of the multiplexer 33d and the positive electrode side of the secondary battery 21C are connected to different one of the conducting routes connecting the multiplexer 32 and a multiplexer 33a. An input stage of the multiplexer 33c and an input stage of the multiplexer 33d and the positive electrode side of the secondary battery 21B are connected to further different one of the conducting routes connecting the multiplexer 32 and the multiplexer 33a. To the conducting route which connects the multiplexer 32 and the positive electrode side of the secondary battery 21A, an input stage of each of the multiplexers 33b, 33c and 33d are connected.

The output stage of the multiplexer 33a is connected to the negative electrode side of the secondary battery 21A. The output stage of the multiplexer 33b is connected to the negative electrode side of the secondary battery 21B. The output stage of the multiplexer 33c is connected to the negative electrode side of the secondary battery 21C. The output stage of the multiplexer 33d is connected to the negative electrode side of the secondary battery 21D. The negative electrode side of each of the secondary batteries 21A-21D are connected to different input stages of the multiplexer 34, respectively. The output stage of the multiplexer 34 is connected to GND (ground).

Change operations of each of the multiplexers 32-34 of the path switching circuit 26 is controlled by the controller 27. For example, by the multiplexer 32 and the multiplexer 34 connecting (selecting) the secondary battery 21A by the controller 27, the path switching circuit 26 can connect the secondary battery 21A to the charging circuit 23 or the discharging circuit 24. Also, regarding the secondary batteries 21B-21D, the path switching circuit 26 can connect the secondary batteries 21B-21D to the charging circuit 23 or the discharging circuit 24 separately by connection switching of the multiplexers 32 and 34.

Figure 5A:
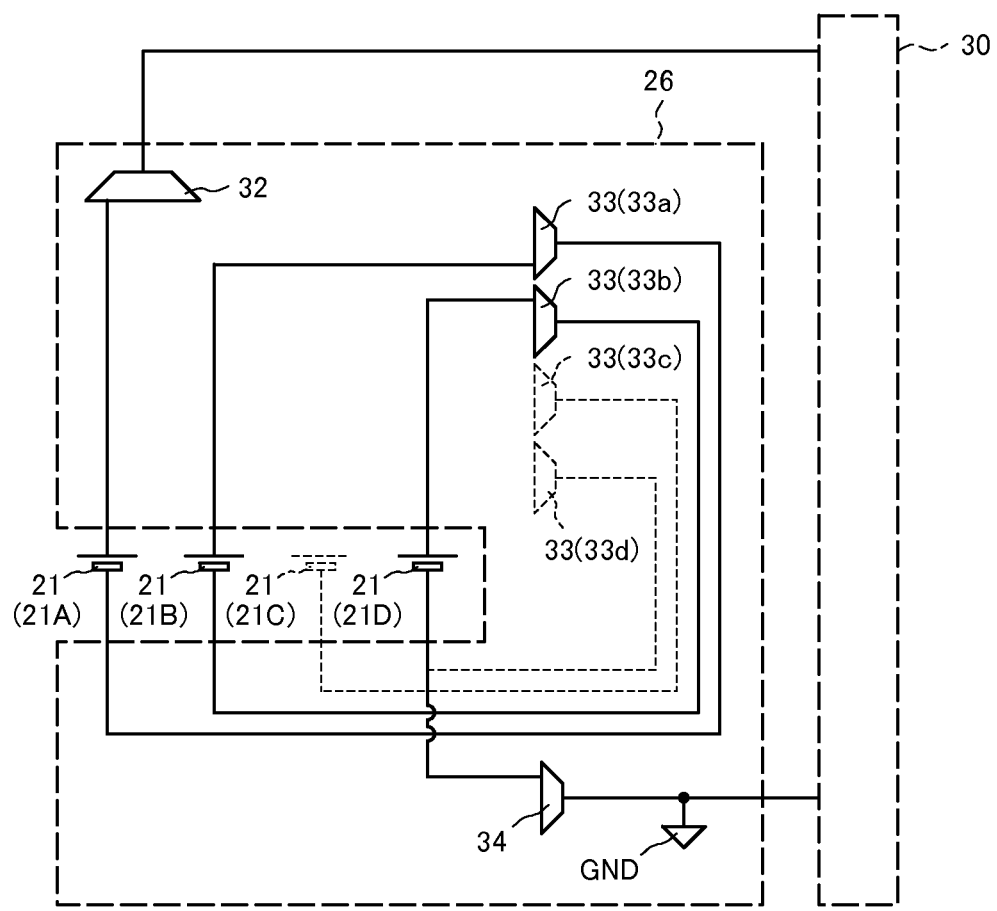
FIG. 5A is a diagram illustrating an example of a circuit operation of a path switching circuit in the second exemplary embodiment.

Further, the path switching circuit 26 can serially connect the plurality of the secondary batteries selected as the power source among the secondary batteries 21A-21D, and connect these serially connected the secondary batteries to the electric power supply destination 30. For example, it is supposed that the secondary batteries 21A, 21B and 21D have been selected as the power source. In this case, by the controller 27, the multiplexer 32 performs connection of (selects) the secondary battery 21A, and the multiplexer 33a performs connection of the secondary battery 21B, and a multiplexer 33b performs connection of the secondary battery 21D, and the multiplexer 34 performs connection of (selects) the secondary battery 21D, as shown in FIG. 5A. By thus controlling the multiplexers 32, 33 and 34, the path switching circuit 26 can serially connect the secondary batteries 21A, 21B and 21D, and connect the secondary batteries 21A, 21B and 21D to the electric power supply destination 30.

Figure 5B:
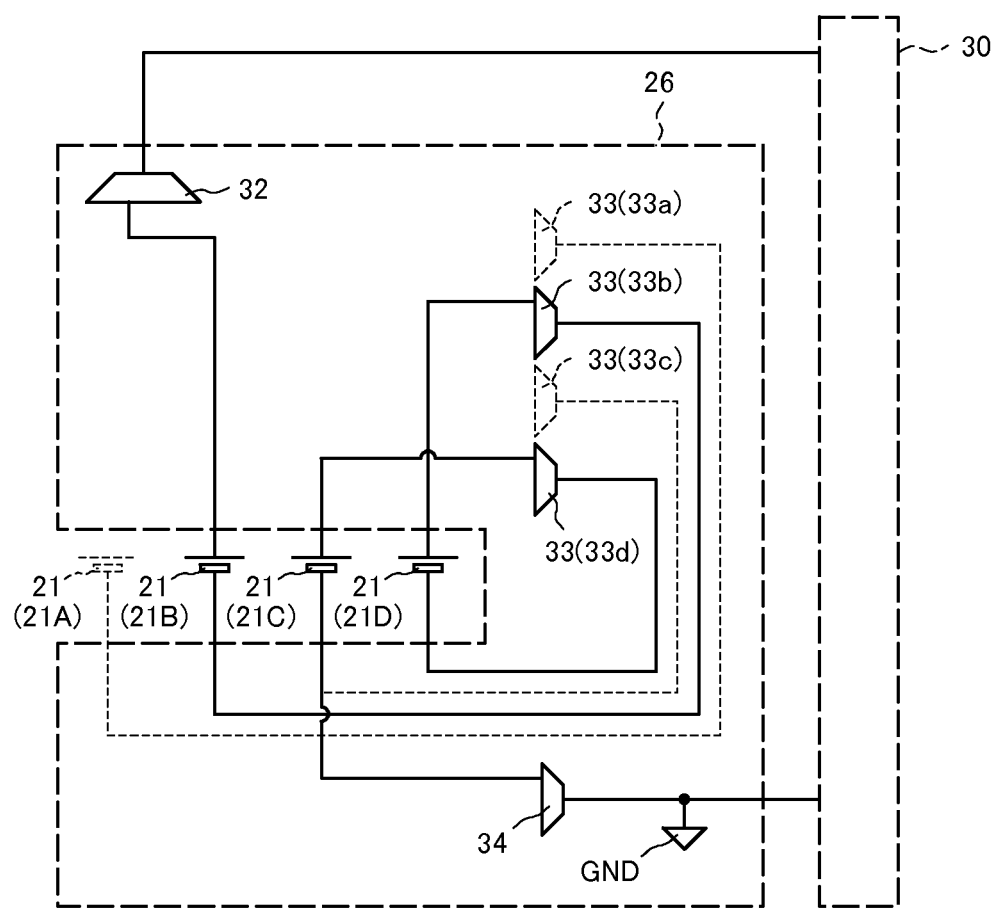
FIG. 5B is a diagram illustrating an example of a circuit operation of the path switching circuit in the second exemplary embodiment.

Similarly, it is supposed that the secondary batteries 21B, 21C and 21D are selected as a power source, for example. In this case, by the controller 27, the multiplexer 32 performs connection of (selects) the secondary battery 21B, the multiplexer 33b performs connection of the secondary battery 21D, the multiplexer 33d performs connection of the secondary battery 21C, and the multiplexer 34 performs connection of (selects) the secondary battery 21C, as shown in FIG. 5B. By thus controlling the multiplexers 32, 33 and 34, the path switching circuit 26 can serially connect the secondary batteries 21B, 21C and 21D, and connect the secondary batteries 21B, 21C and 21D to the electric power supply destination 30.

The measurement unit 25 has a function to measure charging voltage of the secondary batteries 21A-21D connected to the charging circuit 23 or the discharging circuit 24 by the path switching circuit 26. Further, the measurement unit 25 has a function to measure a value of current that flows between the charging circuit 23 or the discharging circuit 24 and the secondary batteries 21A-21D.

The memory 28 is able to store a computer program (software program, program) and data. That is, in this embodiment, the memory 28 stores a program which controls the overall operation of the battery apparatus 20. The memory 28 also stores a degradation amount D and a charge amount (remaining capacity) Ce of each of the secondary batteries 21A-21D calculated by the controller 27. The degradation amount D is information which indicates a degree (degradation state) of degradation (a phenomenon in which an amount of electric power that can be inputted and outputted decreases) of the secondary battery 21. According to the second exemplary embodiment, the degradation amount D is expressed by a falling rate which shows how much the charging and discharging capability of the secondary battery 21 has declined in comparison with the early stage when it has began to be used.

Further, the memory 28 stores an initial internal resistance value Rs and an initial discharge time Ts in each of the secondary batteries 21A-21D. The initial internal resistance value Rs is an internal resistance value of the secondary battery 21 in the early stage, and is obtained by an experiment or the like in advance. The initial discharge time Ts is a time taken when the secondary battery 21 discharges a capacity Cs prescribed in advance in the early stage, and is obtained by an experiment or the like in advance. The memory 28 stores the number of times of charging K of the each secondary battery 21. The memory 28 further stores a threshold value Ph prescribed in advance. The threshold value Ph is a numerical value used when whether the discharge capability of the secondary battery 21 has a capability prescribed in advance or not is determined. The memory 28 stores a threshold value Ps prescribed in advance. The threshold value Ps is a numerical value used when whether the secondary battery 21 should be charged or not is determined.

The memory 28 stores a first prescribed charge amount M for the secondary battery 21 and a second prescribed charge amount N lower than the first charge amount. The first charge amount M is a charge amount requested when the secondary battery 21 functions as a power source, and is set appropriately considering a specification and the like of the secondary battery 21. For example, a charge amount set by the specification as the biggest charge amount (the fully-charged amount; the perfect charge amount) is set as the first charge amount M.

The second charge amount N is a charge amount which is considered as appropriate when the secondary battery 21 is managed (maintained; preserved) as a reserve. That is, degradation of the secondary battery 21 accelerates when a state of a high charge amount continues for a long period. Accordingly, in the second exemplary embodiment, a charge amount of the secondary battery 21 is controlled to the second charge amount N rather than the first charge amount M in order to suppress degradation when it is assumed that electric power is not used for a long time period (in other words, when it is a reserve).

Different amounts are set to the second charge amount N depending on types and the like of the secondary battery 21, respectively. For example, in the case of a lithium (Li) ion battery, the second charge amount N is set to a charge amount which is 50% of the fully-charged amount (perfect charge amount). In a case of a nickel (Ni) hydrogen battery, the second charge amount N is set to a charge amount which is 10-20% of the fully-charged amount (perfect charge amount).

Meanwhile, because a charge amount (remaining capacity) and a charging voltage value of the secondary battery are in proportional relation, charging voltage values corresponding to the first charge amount M and the second charge amount N may be stored in the memory 28 in advance as a first charge amount and a second charge amount.

The controller 27 has a CPU (Central Processing Unit), for example, and controls the overall operation of the battery apparatus 20 by executing the program read from the memory 28. For example, the controller 27 is equipped with a function to charge the secondary batteries 21A-21D as follows when the controller 27 detects that, after the battery apparatus 20 has supplied electric power to the electric power supply destination 30 as an auxiliary power supply due to power stoppage of the main power source 22, the main power source 22 returns to the original conditions.

That is, the controller 27 reads information on the degradation amount D of each of the secondary batteries 21A-21D calculated before from the memory 28, and compares the degradation amount D of each of the secondary batteries 21A-21D. The controller 27 selects the secondary battery 21 of the smallest degradation amount (of the lightest degradation state) based on the comparison. Then, by controlling each of the multiplexers 32-34 in the path switching circuit 26, the controller 27 connects the selected secondary battery 21 to the charging circuit 23 via the path switching circuit 26, and begins charging of the selected secondary battery 21 by the charging circuit 23. The controller 27 takes in a charging voltage of the secondary battery 21 by the measurement unit 25 every moment during the charging. When detecting that a charge amount of the secondary battery 21 has reached the first charge amount M stored in the memory 28 by using a charging voltage measured by the measurement unit 25, the controller 27 ends the charging of the secondary battery 21.

After that, the controller 27 selects the secondary battery 21 of the smallest degradation amount D (of the lightest degradation state) among the secondary batteries 21 that have not been charged yet. Then, in a manner similar to the above, the controller 27 charges the selected secondary battery 21 to the first charge amount M. Following such procedure, the controller 27 charges pieces of the secondary battery 21 of a number required as a power source to the first charge amount M. In other words, the controller 27 charges the secondary battery 21 in a manner that a charge amount becomes the first charge amount M until a numerical value (the sum) U made by totaling the charge amount of the each secondary battery 21 for which charging processing has ended reaches a numerical value requested by the electric power supply destination 30.

After that, the controller 27 begins charging of the secondary battery 21 that have not been selected as a power source (hereinafter, the secondary battery 21 that has come free from a power source is also referred to as the secondary battery 21 as a reserve). That is, the controller 27 connects one of the secondary batteries 21 as a reserve to the charging circuit 23 via the path switching circuit 26. Then, the controller 27 charges the secondary battery 21 as a reserve by the charging circuit 23 so that a charge amount (remaining capacity) may become the second charge amount N by using remaining capacity Ce stored in the memory 28.

As mentioned above, the controller 27 charges all of the secondary batteries 21A-21D after the main power source 22 has recovered. That is, the controller 27 selects the secondary batteries 21 of a number required as the power source in the order of a degradation state from the lightest to the heaviest from the secondary batteries 21A-21D, and charges the selected secondary battery 21 to the first charge amount M so that they may effectively function as a power source. On the other hand, among the secondary batteries, the controller 27 controls to treat one or more prescribed secondary batteries as a reserve which are in a degradation state compared with one or more prescribed secondary batteries selected as the power source, and controls to charge them to the second charge amount N that is suitable for preservation. In other words, the secondary battery as the reserve is maintained (preserved) in a state that degradation is suppressed.

Further, the controller 27 has a function to update information stored in the memory 28. For example, when the secondary batteries 21 have been charged as mentioned above, the controller 27 adds 1 to the number of times of charging K of the each secondary battery 21 in the memory 28, and stores (K+1) made by this addition in the memory 28 as the new number of times of charging K (for example, update is made by overwriting K).

Further, based on a measured value related to charging processing like the above, the controller 27 calculates degradation amount D of the secondary battery 21, and updates the degradation amount D of the secondary battery 21 in the memory 28 to the calculated new degradation amount D.

For example, the controller 27 calculates the degradation amount D of the secondary battery 21 by using a change in an internal resistance value Rt of the secondary battery 21 due to degradation. Here, it is assumed that a charging voltage of the secondary battery 21 measured by the measurement unit 25 just before charging of the secondary battery 21 by the charging circuit 23 is ended is a during-charging charging voltage Va. Also it is assumed that a charging voltage of the secondary battery 21 measured by the measurement unit 25 when the charging circuit 23 and the secondary battery 21 is in an electrically non-connection state because of the end of charging is a charging-end charging voltage Vb. Further, it is assumed that a current value that is flowing between the charging circuit 23 and the secondary battery 21 is a charging current value Ia.

The internal resistance value Rt of the secondary battery 21 can be calculated by a following mathematical expression (1).

$$Rt=(Va-Vb)/Ia \qquad (1)$$

Where the symbol "/" means a division in this patent application.

In this regard, however, Rt in the mathematical expression (1) shows an internal resistance value of the secondary battery 21. Va shows a during-charging charging voltage. Vb shows a charging-end charging voltage. Ia shows a charging current value.

The degradation amount D of the secondary battery 21 can be calculated based on a following mathematical expression (2) by using an internal resistance value calculated as mentioned above.

$$D=Rt/Rs \qquad (2)$$

In this regard, however, D in the mathematical expression (2) shows a degradation amount. Rt shows a calculated internal resistance value. Rs shows an initial internal resistance value.

The controller 27 acquires a measured values related to charging processing of the secondary battery 21 (the during-charging charging voltage Va, the charging-end charging voltage Vb and the charging current value Ia) from the measurement unit 25 as battery status information, and calculates the internal resistance value Rt of the secondary battery 21 based on these measured values and the mathematical expression (1). Then, the controller 27 calculates the degradation amount D of the secondary battery 21 based on the calculated internal resistance value Rt, the initial internal resistance value Rs read from the memory 28 and the mathematical expression (2). After that, the controller 27 updates the degradation amount D of the secondary battery 21 in the memory 28 to the calculated new degradation amount D.

Meanwhile, although the degradation amount D calculated as above may be stored (updated) in the memory 28 just as it is, the degradation amount D may be corrected as follows and degradation amount Dh after the correction be stored in the memory 28 as the new degradation amount D. For example, the controller 27 possesses a clock mechanism (not shown) which is one of information collection units, and, at the time of charging of the secondary battery 21, acquires a time (charging time Tj) which the secondary battery 21 needs for charging as the battery status information based on the clock mechanism. Then, after charging of the secondary battery 21 has been ended, the controller 27 calculates charging cycle degradation information S based on the charging time Tj, the charging current value Ia by the measurement unit 25, the number of times of charging K of the secondary battery 21 read from the memory 28 and a following mathematical expression (3).

$$S=Ia \times Tj \times K \qquad (3)$$

Where the symbol "×" means a multiplication in this patent application.

In this regard, however, S indicates charging cycle degradation information. Ia shows a charging current value. Tj shows a charging time. K shows the number of times of charging.

By using the charging cycle degradation information S that has been calculated as above, the controller 27 corrects the degradation amount D, and updates the degradation amount D of the secondary battery 21 in the memory 28 by the degradation amount Dh after the correction as the new degradation amount D.

The degradation amount D of the secondary battery 21 can be calculated even if using a measured value measured in processing of discharging electricity of the secondary battery 21. That is, the degradation amount D is also information which indicates a degradation state of the discharging capability of the secondary battery 21 relative to its initial discharging capability. Accordingly, when it is supposed that discharging capability at a measurement time is H and the initial discharging capability is Hs, the degradation amount D can be calculated by a mathematical expression of "H/Hs".

Discharging capability is a capacity (an amount of charge) that can be discharged per an unit time prescribed in advance. A capacity (an amount of charge) that has been discharged can be calculated by integrating a discharge current Ih which flows by discharging. From the above, discharging capability H can be calculated based on a following mathematical expression (4).

$$H=Z/Th \quad (4)$$

In this regard, however, H indicates discharging capability. Z indicates an integrated value of discharge current value Ih. Th shows a discharge time.

The discharging capability H can be calculated as mentioned above. Further, according to this second exemplary embodiment, the discharging circuit 24 is configured so that a discharge current which flows by discharging of the secondary battery 21 may be constant, as it has been mentioned above. Considering these, the degradation amount D can be calculated by a following mathematical expression (5).

$$D=H/Hs=(Z/Th)/(Z/Ts)=Ts/Th \quad (5)$$

In this regard, however, Ts shows an initial discharge time taken to discharge the capacity Cs (an integrated value of discharge current value Ih is Z=Cs). Th shows a measured discharge time taken to discharge the capacity Cs.

The controller 27 calculates the degradation amount D based on: the discharge time Th as the battery status information measured by a clock mechanism (not shown) in relation to discharging processing by the discharging circuit 24 for discharging the secondary battery 21; the initial discharge time Ts read from the memory 28; and mathematical expression (5). Then, the controller 27 updates the degradation amount D of the secondary battery 21 in the memory 28 to the calculated new degradation amount D.

Further, the controller 27 is equipped with a charge amount maintaining function to maintain a charge amount of the secondary battery 21 as the power source to the first charge amount M. For example, the controller 27 measures remaining capacities (charge amounts) of secondary batteries 21 as the power source in turn every time interval prescribed in advance (every 8 minutes, for example) based on the clock mechanism (not shown). Specifically, it is supposed that the secondary batteries 21B-21D are selected as the power source, for example. The controller 27 connects the multiplexer 32 of the path switching circuit 26 to one of the secondary batteries 21B-21D (the secondary battery 21B, for example). The controller 27 acquires a charging voltage of the secondary battery 21B measured in this state from the measurement unit 25. The controller 27 calculates a remaining capacity (charge amount) of the secondary battery 21B based on: relation data between a charging voltage and a remaining capacity (charge amount) stored in the memory 28 in advance; and a charging voltage of the secondary battery 21B by the measurement unit 25. Then, the controller 27 updates the remaining capacity Ce of the secondary battery 21B in the memory 28 to the calculated remaining capacity. After that, the controller 27, also about the remaining secondary batteries 21C and 21D as the power source, calculates remaining capacities in turn by a procedure similar to the above, and updates each remaining capacity Ce of the secondary batteries 21C and 21D in the memory 28.

The controller 27 calculates a sum U of pieces of remaining capacity Ce of the secondary batteries 21B-21D as the power source, and compares the calculated sum U with the threshold value Ps given in advance. The threshold value Ps is a numerical value for determining whether to charge the secondary batteries 21B-21D as the power source or not. For example, it is supposed that the secondary batteries 21B-21D are a nickel-hydride battery. It is also supposed that the sum when each of the secondary batteries 21B-21D is charged to the first charge amount M is a sum Us. It is further supposed that the secondary batteries 21B-21D cannot supply a required electric power as the power source to the electric power supply destination 30 when the sum U of the remaining capacities of the secondary batteries 21B-21D falls to 80% or less of the sum Us in the case of the first charge amount. In such cases, the threshold value Ps is set to a numerical value of 82%, for example, of the aforementioned sum Us considering that it is desirable to suppress the number of times of charging.

When detecting that the sum U of the remaining capacities of the secondary batteries 21B-21D has declined below the threshold value Ps, the controller 27 controls the path switching circuit 26 and the charging circuit 23, and, by this, charges each of the secondary batteries 21B-21D, successively, to the first charge amount M by the control procedure of charging processing mentioned above.

As mentioned above, the controller 27 keeps a charge amount of the secondary battery 21 as the power source in an appropriate state in consideration of suppressing degradation of the secondary battery 21.

Further, the controller 27 is also equipped with the following function to reorganize the secondary batteries 21. The controller 27 begins the reorganization function every time when timing prescribed in advance is reached. For example, when the number of the secondary batteries 21 as a reserve is one, the controller 27 selects the secondary battery 21. Alternatively, when there is a plurality of the secondary battery 21 as the reserve, the controller 27 selects the secondary battery 21 having the lowest degradation amounts (the lightest degradation state) among the secondary batteries 21 as the reserve. The controller 27 connects the selected secondary battery 21 (it is supposed that it is the secondary battery 21A) to the charging circuit 23 via the path switching circuit 26. As a result, the controller 27 charges the secondary battery 21A until a charge amount becomes the first charge amount M in a similar manner to the above. In other words, the controller 27 selects one of the secondary batteries 21 as the reserve (a spare secondary battery 21 having the lightest degradation state) as a new power source, and charges it to the first charge amount M so that the secondary battery 21 can function as the power source.

Then, using the battery status information (the during-charging charging voltage Va, the charging current value Ia and the charging-end charging voltage Vb) acquired in the charging processing and the initial internal resistance value Rt of the secondary battery 21A in the memory 28, the controller 27 calculates the degradation amount D of the secondary battery 21A as above.

After that, referring to the degradation amount D stored in the memory 28, the controller 27 selects the secondary battery 21 of the worst degradation state (for example, it is supposed that it is the secondary battery 21C) from the secondary batteries 21B-21D selected as the power source. The controller 27 carries out refreshment processing to the selected secondary battery 21 (21C). In the refreshment processing, the controller 27 makes the secondary battery 21 to be discharged to a minimum capacity prescribed in advance (perfectly discharged), and, after that, charges the secondary battery 21.

Specifically, the controller 27 connects the selected secondary battery 21C to the discharging circuit 24 via the path switching circuit 26, and discharges the secondary battery 21C by the discharging circuit 24. The controller 27 acquires battery status information (the discharge time Th and the discharge current value Ih) which is information indicating a discharging situation due to the discharging processing. The controller 27 calculates the discharging capability H of the secondary battery 21C as mentioned above based on the acquired information and the mathematical expression (4) mentioned above.

After that, the controller 27 compares the calculated discharging capability H with the threshold value Ph in the memory 28, and determines as there is no problem when the discharging capability H is equal to or greater than the threshold value Ph. When detecting that the discharging capability H is less than the threshold value Ph, the controller 27 carries out an operation prescribed in advance. For example, the controller 27 outputs a signal to report that discharging capability of a battery has declined to a level less than an allowable range.

Further, the controller 27 calculates the degradation amount D of the secondary battery 21C in relation to discharging processing as mentioned above, and updates the degradation amount D of the secondary battery 21C in the memory 28.

Moreover, the controller 27 connects the secondary battery 21C that has been discharged to the charging circuit 23 via the path switching circuit 26, and charges the secondary battery 21C by the charging circuit 23. The secondary battery 21C is a battery which will be a reserve as substitute for the secondary battery 21A (in other words, the secondary battery selected by the reorganization function (reorganization processing) as the power source newly). For this reason, the controller 27 charges the secondary battery 21C by the charging circuit 23 so that a charge amount of the secondary battery 21C will be the second charge amount N that is appropriate as the reserve. After the charge, the controller 27 updates the number of times of charging K of the secondary battery 21C in the memory 28 with (K+1) which has been made by adding 1 to it as the new number of times of charging K.

As mentioned above, the controller 27 carries out refreshment processing of the secondary battery having the largest degradation amount (the worst degradation state) among the secondary batteries 21 selected as the power source. The secondary battery after the refreshment processing is maintained as the reserve.

Besides the cases in which, as mentioned above, the secondary batteries 21 are charged and discharged separately and in which a remaining capacity (charge amount) of the each secondary battery 21 is measured, the controller 27 controls the path switching circuit 26 when the main power source 22 goes out so that the plurality of the secondary batteries 21 selected as the power source can supply electric power to the electric power supply destination 30 quickly. In other words, the controller 27 controls the path switching circuit 26 so that the plurality of the secondary batteries selected as the power source may be connected in series, for example. Specifically, when the secondary batteries 21B-21D are selected as the power source, the controller 27 controls the multiplexers 32-34 of the path switching circuit 26 so that the connection state shown in FIG. 5A is realized. When, by reorganization of the secondary batteries 21, the secondary batteries 21A, 21B and 21D become the power source and the secondary battery 21C is reorganized as a reserve, the controller 27 controls the path switching circuit 26 as shown in FIG. 5B.

An example of a control operation of the controller 27 will be described with reference to FIGS. 6-9 below. FIGS. 6-9 are flow charts showing control procedures which the controller 27 carries out, respectively.

When the main power source 22 returns to the original condition (Step S101 shown in FIG. 6) after the electric power of the secondary batteries 21 has been supplied by the battery apparatus 20 to the electric power supply destination 30 due to a blackout of the main power source 22, the controller 27 reads the degradation amount D of each of the secondary batteries 21A-21D from the memory 28 (Step S102). After that, the controller 27 selects a specific secondary battery 21 that has the smallest degradation amounts (the lightest degradation state) as the power source among the secondary batteries 21A-21D (Step S103). The controller 27 charges the specific secondary battery (the selected secondary battery) 21 until a charge amount of the specific secondary battery 21 reaches the first charge amount M (Step S104).

Here, a control procedure in the charging processing controlled by the controller 27 will be described by using a flow chart shown in FIG. 7. First, the controller 27 connects the secondary battery 21 as a charging target to the charging circuit 23 via the path switching circuit 26 (Step S201) and begins charging of the secondary battery 21 (Step S202). The controller 27 acquires a charging voltage of the secondary battery 21 measured by the measurement unit 25 momentarily, and determines whether or not a charge amount of the secondary battery based on the charging voltage has reached the first charge amount M (in other words, whether the charge has been completed) (Step S203). As a result, when determining that charge has not been completed yet, the controller 27 repeats the above determination operation of Step S203 while continuing charging.

In contrast, when determining that charge has been completed, the controller 27 acquires the charging voltage of the secondary battery 21 at that time as the during-charging charging voltage Va that is one piece of the battery status information from the measurement unit 25. During the charging, the controller 27 acquires a current value of the electric current flowing between the secondary battery 21 and the charging circuit 23 as the charging current value Ia that is one piece of the battery status information from the measurement unit 25. Then, the controller 27 separates the secondary battery 21 for which charging has been completed from the charging circuit 23 (Step S204). The controller 27 acquires a charging voltage of the secondary battery 21 for which charging has been completed and which has been separated from the charging circuit 23 electrically as the charging-end charging voltage Vb that is one piece of the battery status information from the measurement unit 25.

After that, the controller 27 calculates the degradation amount D of the secondary battery 21 for which charging has been completed by using the battery status information acquired as above (Step S205), and updates the degradation amount D of the secondary battery in the memory 28. The controller 27 controls charging processing by such procedure.

Figure 6:
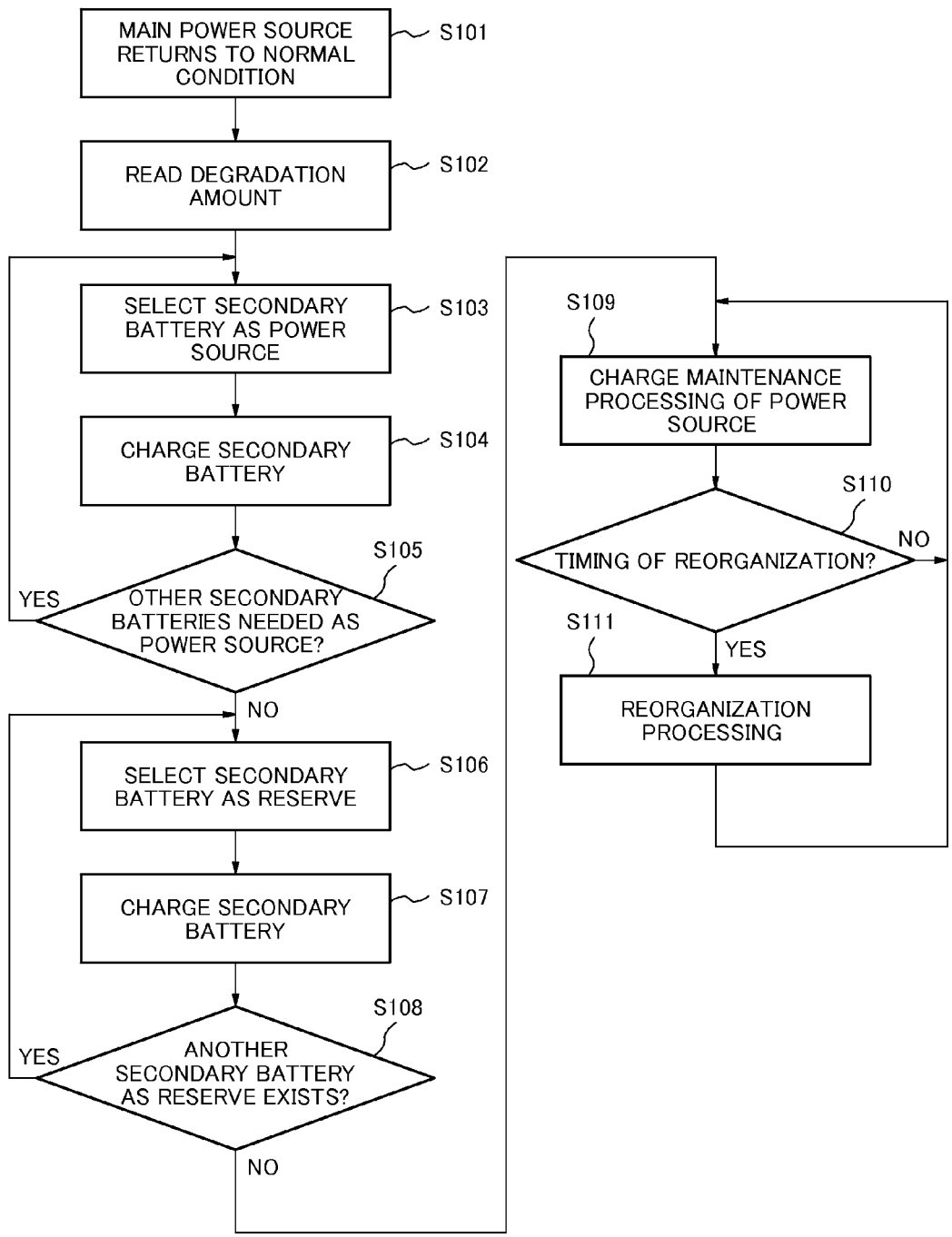
FIG. 6 is a flow chart showing an example of a control procedure which is carried out by a control device in the second exemplary embodiment.

After charging one secondary battery 21 as the power source as shown above, the controller 27 determines whether the other the secondary batteries 21 are needed as the power source or not (Step S105 shown in FIG. 6). In other words, the controller 27 determines whether the secondary batteries 21 of a number needed as the power source have been charged or not.

When determining that the other secondary batteries 21 are needed (that is, a number of the secondary batteries 21 needed as the power source have not been charged yet), the controller 27 repeats operations after Step S103. In other words, the controller 27 selects the specific secondary battery 21, which has the least degradation amount, among the secondary batteries 21 to which the charging processing described above has not been performed yet, and carries out the charging processing to the specific secondary battery 21.

In contrast, when determining that the other secondary batteries are not required as the power source (that is, a number of the secondary batteries 21 have been charged as the power source), next, the controller 27 selects the specific secondary battery 21 as the reserve (Step S106). In other words, when the number of remaining of the secondary batteries 21 that are not selected as the power source is one, the controller 27 selects that secondary battery 21 as the reserve. When the number of remaining of the secondary batteries 21 that are not selected as the power source is plural, the controller 27 selects the specific secondary battery 21, which has the smallest degradation amount, among the secondary batteries 21 as the reserve. The controller 27 charges the selected secondary battery 21 by the charging circuit 23 until a charge amount of the selected secondary battery 21 reaches the second charge amount N (Step S107). The charging processing in Step S107 is also controlled by the controller 27 by the procedure shown in FIG. 7 mentioned above. In this regard, however, charging of the secondary battery 21 as the reserve finishes when a charge amount reaches the second charge amount N that is smaller than the first charge amount M.

After that, the controller 27 determines whether there is another secondary battery 21 as the reserve (Step S108). When determining that there is another secondary battery 21, the controller 27 repeats the operations after Step S106. In contrast, when judging that there are no other secondary batteries as the reserve, the controller 27 begins charge maintenance processing (charge maintenance function) of the power source (Step S109). In the charge maintenance processing, the controller 27 acquires a charging voltage of the plurality of the secondary batteries 21 selected as the power source successively from the measurement unit 25 every time interval prescribed in advance. The controller 27 updates a remaining capacity (charge amount) of the secondary battery 21 based on the acquired charging voltage of the secondary battery 21 as the remaining capacity Ce of the secondary battery 21 in the memory 28.

The controller 27 calculates the sum U of the remaining capacities of the plurality of the secondary batteries 21 as the power source acquired thus, and determines whether charging is needed or not based on comparison of the sum U and the threshold value Ps. When determining that charging is needed, the controller 27 charges the each secondary battery 21 as the power source to the first charge amount M in a similar manner described above.

When the above charge maintenance processing is being repeated intermittently, the controller 27 determines whether it is a reorganization time (reorganization timing) prescribed in advance in a waiting time period between two pieces of charge maintenance processing, for example (Step S110). When determining that it is not reorganization time, the controller 27 repeats the charge maintenance processing. When determining that it is reorganization time, the controller 27 carries out reorganization processing (Step S111).

Figure 9:
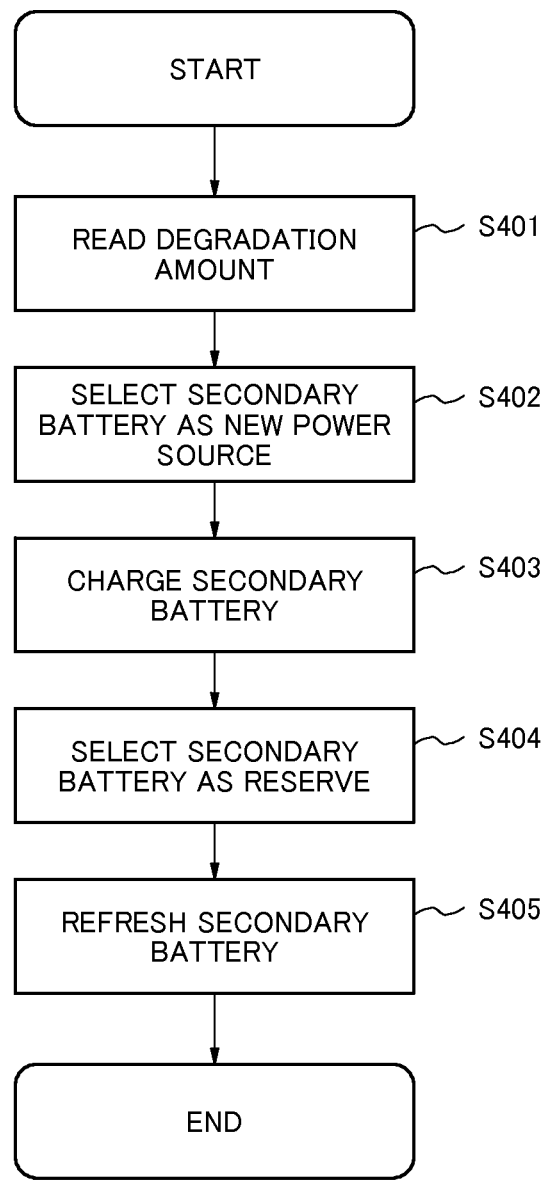
FIG. 9 is a flow chart showing an example of a control procedure of reorganization processing which the control device in the second exemplary embodiment carries out.

Here, a control procedure of the reorganization processing which the controller 27 carries out will be described with reference to FIG. 9. First, the controller 27 reads the degradation amount D of the each secondary battery 21 from the memory 28 (Step S401 shown in FIG. 9). When the number of the secondary batteries 21 as the reserve is one, the controller 27 selects the reserved secondary battery 21 as a new power source. When the number of the secondary batteries 21 as the reserve are plural, the controller 27 selects a specific secondary battery 21 that has the smallest degradation amount (the lightest degradation state) as a new power source among those plurality of the reserved of secondary batteries 21 (Step S402).

Figure 7:
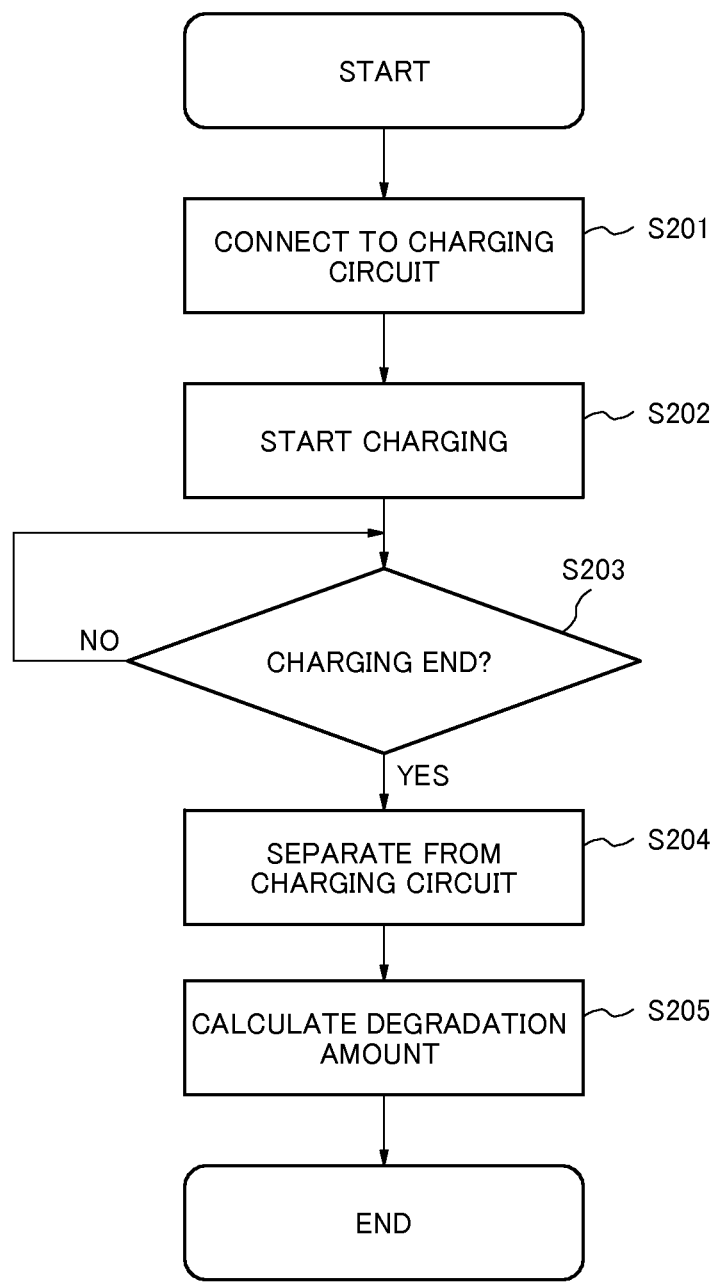
FIG. 7 is a flow chart showing an example of a control procedure of charging processing which the control device in the second exemplary embodiment carries out.

After that, the controller 27 charges the secondary battery 21 selected as a new power source by the charging circuit 23 using the control procedure as shown in FIG. 7 so that a charge amount of the secondary battery 21 becomes the first charge amount M (Step S403).

After that, the controller 27 selects the specific secondary battery 21 having the largest degradation amount (the worst degradation state) as a new reserve among the secondary batteries 21 having been selected as the power source (Step S404). The controller 27 refreshes the secondary battery 21 as the new reserve (Step S405). In other words, the controller 27 discharge the secondary battery 21 as the new reserve, and, after the discharging, charges it by the charging circuit 23 using the control procedure as shown in FIG. 7 so that a charge amount of the secondary battery 21 may become the second charge amount N that is appropriate as the reserve.

Figure 8:
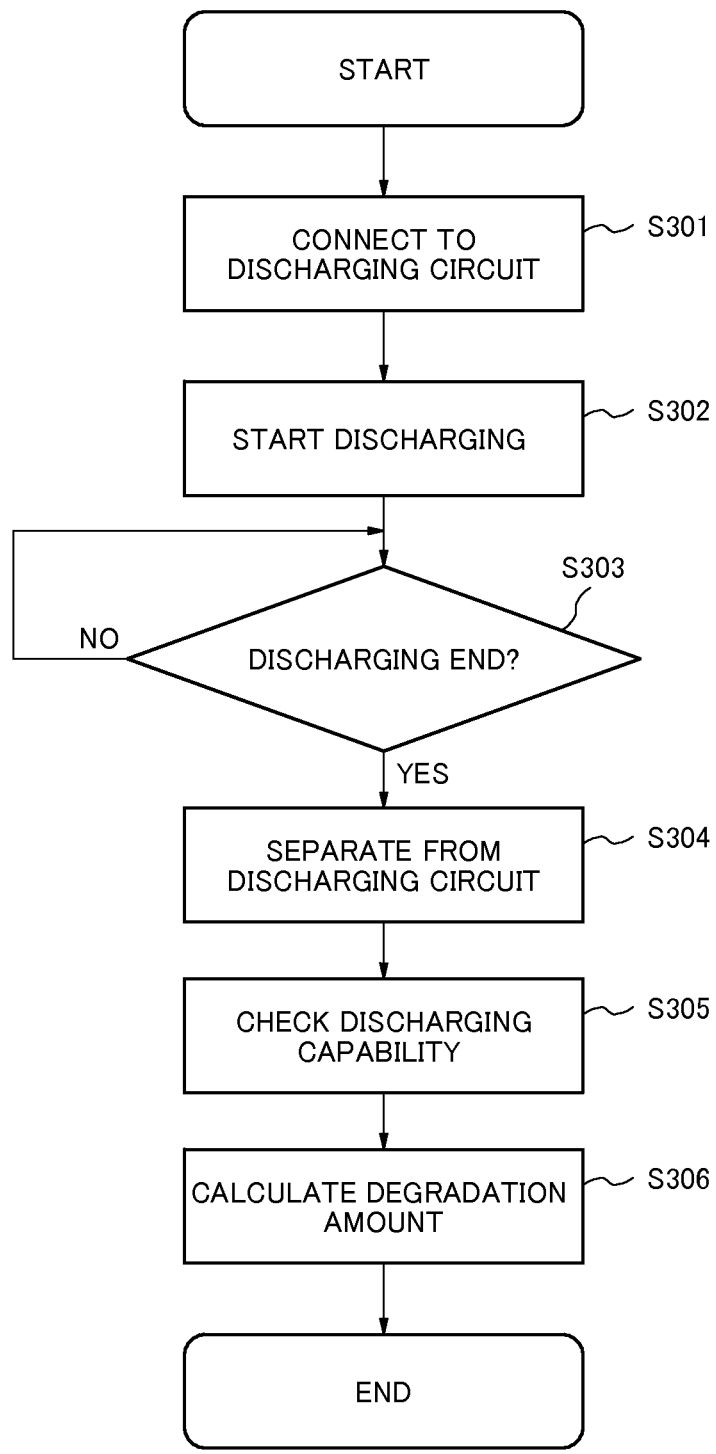
FIG. 8 is a flow chart showing an example of a control procedure of discharging processing which the control device in the second exemplary embodiment carries out.

Here, a control procedure of discharging processing controlled by the controller 27 will be described with reference to FIG. 8. First, the controller 27 connects the secondary battery 21 as a discharge target to the discharging circuit 24 via the path switching circuit 26 (Step S301 shown in FIG. 8), and begins discharging of the secondary battery 21 (Step S302). The controller 27 determines whether discharge of the secondary battery 21 has been completed based on a charging voltage of the secondary battery 21 acquired from the measurement unit 25, for example, (Step S303). When determining that discharging has not finished yet, the controller 27 repeats the determination operation of Step S303 mentioned above while continuing discharging. In contrast, when determining that discharging has finished, the controller 27 acquires the discharge time Th taken for discharging by using a clock mechanism as one piece of the battery status information. The controller 27 separates the secondary battery 21 of the discharge target from the discharging circuit 24 (Step S304).

The controller 27 calculates the discharging capability H of the discharged secondary battery 21 based on the acquired discharge time Th, the discharge current value Ih which is one piece of the battery status information acquired from the measurement unit 25 during discharging and the above-mentioned mathematical expression (4). By comparison of the calculated discharging capability H and the threshold value Ph read from the memory 28, the controller 27 checks whether the discharging capability of the secondary battery 21 is appropriate or not (Step S305). The controller 27 calculates the degradation amount D of the secondary battery 21 that has been discharged (Step S306), and updates the degradation amount D of the secondary battery 21 in the memory 28 to the calculated degradation amount D.

By the above procedure, the controller 27 controls the discharging processing.

After the reorganization processing (Step S111) shown in FIG. 6 has ended, the controller 27 repeats the operations after Step S109 mentioned above.

When the main power source 22 goes out in midstream of the control operation shown in FIG. 6, the controller 27 connects a plurality of the secondary batteries 21 as the power source by the path switching circuit 26. As a result, the battery apparatus 20 supplies needed electric power to the electric power supply destination 30.

As is the case with the first exemplary embodiment, the battery apparatus 20 of the second exemplary embodiment can manage the secondary batteries 21 separately, and, by this, can equalize degradation states of the secondary batteries 21. In other words, according to the second exemplary embodiment, as it has been mentioned above, the controller 27 of the battery apparatus 20 selects the secondary batteries 21 as the power source by using the degradation amount D of each of the secondary batteries 21. The controller 27 changes a combination of the secondary batteries 21 as the power source by using the degradation amount D. By such control operation by the controller 27, degradation states of the secondary batteries 21 that the battery apparatus 20 possesses can be equalized. By this, the life expectancy of the battery apparatus 20 can be made long.

Also, in the second exemplary embodiment, by the controller 27, a secondary battery 21 whose degradation state is poor among the secondary batteries 21 as a management object is made to be the reserve, and a charge amount of the secondary battery 21 as the reserve is made to be adjusted to the second charge amount N that is lower and that suppresses degradation. Because charge maintenance processing is not performed to the secondary battery 21 as the reserve, charging frequency can be suppressed. Thus, about the secondary battery 21 as the reserve, because a charge amount can be suppressed low and the charging frequency is reduced, progress of degradation of the secondary battery 21 as the reserve can be suppressed.

Because the battery apparatus 20 of the second exemplary embodiment can manage the secondary batteries 21 separately, a combination of the secondary batteries 21 as the power source can be changed freely. By this, the number of the secondary batteries 21 as the reserve can be made less than the number of the secondary batteries 21 as the power source. Miniaturization and cost reduction of the battery apparatus 20 can be promoted by this.

Other Exemplary Embodiments

Figure 10:
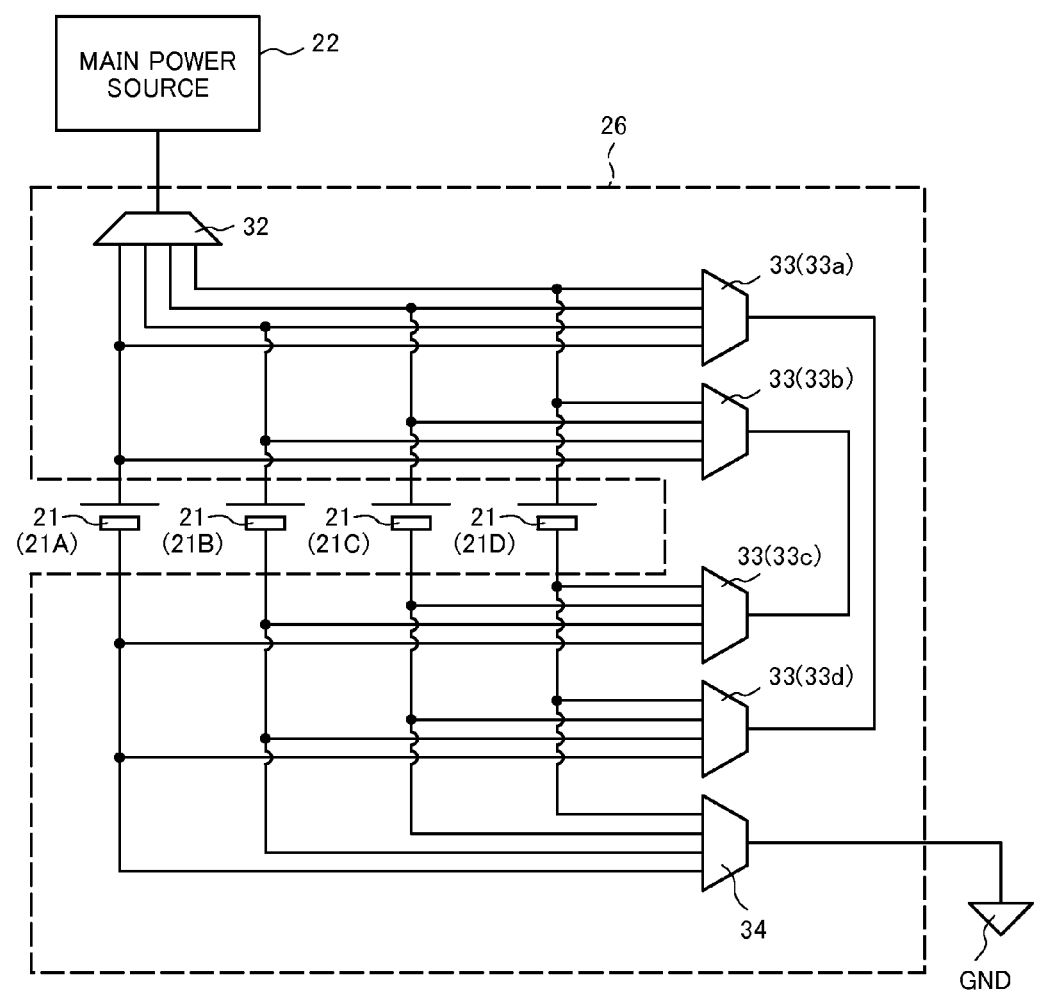
FIG. 10 is a circuit diagram showing another example of a circuit configuration of a path switching circuit.

Meanwhile, the present invention is not limited to the first and second exemplary embodiments, and other exemplary embodiments can also be adopted. For example, although a circuit configuration shown in FIG. 4 is indicated as an example of the path switching circuit 26 in the second exemplary embodiment, the path switching circuit 26 is not limited to the circuit configuration shown in FIG. 4. The path switching circuit 26 may adopt the circuit configuration shown in FIG. 10, for example.

Further, although the battery apparatus 20 that is included in a disk array apparatus is indicated as an example in the second exemplary embodiment, an apparatus which includes the battery apparatus of the present invention may be an apparatus besides a disk array apparatus. In addition, although the battery apparatus 20 of the second exemplary embodiment is equipped with the four secondary batteries 21 (21A-21D), the number of the secondary batteries 21 provided in the battery apparatus 20 is set appropriately considering the amount of electric power requested as the power source, if it is no smaller than three.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

DESCRIPTION OF SYMBOLS

1 Battery management device
2, 21 Secondary battery
4, 23 Charging circuit
5, 24 Discharging circuit
6 Information collection unit
7, 26 Path switching circuit
8, 27 Controller
10, 20 Battery apparatus
12 Disk array apparatus
13 Hard disks
22 Main power source
25 Measurement unit
28 Memory
30 Electric power supply destination
32, 33, 34 Multiplexer

The invention claimed is:
1. A battery management device, comprising:
a charging circuit to charge a secondary battery;
a discharging circuit to discharge the secondary battery;
a path switching circuit including a function to switchably connect no smaller than three secondary batteries to be managed with one of the charging circuit and the discharging circuit separately, and a function to connect a plurality of the secondary batteries selected as a power source among the secondary batteries to be managed such that the secondary batteries selected as a power source are in a specific connection state;
an information collection unit to collect at least one of information indicating a charging situation about the secondary battery connected to the charging circuit via the path switching circuit, and information indicating a discharging situation about the secondary battery connected to the discharging circuit via the path switching circuit as battery status information; and
a controller to calculate a degradation state of each of the secondary batteries as a management objects based on the battery status information, and manage each of the secondary batteries as management objects based on the calculated degradation state,
wherein the controller includes:
a function to select the plurality of the secondary batteries as the power source by using the degradation state,
a reorganization function to make one of the secondary batteries not selected as the power source be a new power source as substitute for one of the secondary batteries selected based on the degradation state among the secondary batteries having been selected as the power source,
a refreshing function to activate the secondary battery having been disconnected from the power source by the reorganization function using the discharging circuit and the charging circuit, and a function to control the path switching circuit according to a prescribed control procedure.

2. The battery management device according to claim 1, wherein
the controller selects a number of the secondary batteries needed as the power source in order of the degradation state from best to worst as the power source.

3. The battery management device according to claim 1, wherein
the controller controls one of a charge operation by the charging circuit and a discharging operation by the discharging circuit so as to adjust a charge amount of the secondary battery selected as the power source to a prescribed first charge amount and a charge amount of the secondary battery not selected as the power source to a prescribed second charge amount lower than the first charge amount, respectively.

4. The battery management device according to claim 1, wherein
the controller monitors a charge amount of each of the secondary batteries selected as the power source and controls, when a sum of the charge amounts becomes below a threshold value, the path switching circuit and the charging circuit so as to charge each of the secondary batteries selected as the power source.

5. The battery management device according to claim 1, wherein
the controller calculates a degradation state of the secondary battery by using the battery status information collected by the information collection unit when the secondary battery is discharged or charged by the refreshing function.

6. The battery management device according to claim 1, wherein,
after electric power of the secondary battery has been used as the power source, the controller connects the secondary battery to the charging circuit via the path switching circuit and charges the secondary battery by the charging circuit, and calculates a degradation state of the secondary battery using the battery status information collected by the information collection unit about this charging.

7. A battery apparatus, comprising:
no smaller than the three secondary batteries; and
the battery management device according to claim 1 to manage the secondary batteries.

8. The battery apparatus according to claim 7, wherein
a number of the secondary batteries not being managed by the battery management device as the power source is less than a number of the secondary batteries being managed by the battery management device as the power source.

9. A disk array apparatus, comprising:
a plurality of hard disks being a storage medium capable of at least one of being read and being written by a computer; and
the battery apparatus according to claim 7 as an auxiliary power supply.

10. A battery management method comprising:
by a computer,
collecting at least one of information indicating a charging situation about a secondary battery to be managed and information indicating a discharging situation about the secondary battery being discharged as battery status information;
calculating a degradation state of the secondary battery to be managed based on the battery status information;
selecting one of a plurality of secondary batteries having not been selected as a power source among no smaller than three secondary batteries to be managed as a new power source based on the degradation state;
selecting one of the plurality of the secondary batteries having been selected as the power source based on the degradation state and disconnecting the selected secondary battery from the power source;
changing a combination of the plurality of the secondary batteries as the power source; and
activating the secondary battery having been disconnected from the power source by discharging and charging the secondary battery.

11. A controller to calculate a degradation state of each of secondary batteries as a management objects, and manage each of the secondary batteries as management objects based on the calculated degradation state,
the controller performs to:
collect at least one of information indicating a charging situation about a secondary battery to be managed and information indicating a discharging situation about the secondary battery being discharged as battery status information;
calculate a degradation state of the secondary batter to be managed based on the battery status information;
select a plurality of the secondary batteries as a power source among no smaller than three secondary batteries to be managed by using the calculated degradation state;
make one of the secondary batteries not selected as the power source be a new power source as substitute for one of the secondary batteries selected based on the degradation state among the secondary batteries having been selected as the power source;
select one of the secondary batteries having been selected as the power source based on the degradation state and disconnect the selected secondary battery from the power source; and
activate the secondary battery having been disconnected from the power source by discharging and charging the secondary battery.

* * * * *